United States Patent
Royer

(10) Patent No.: US 6,732,812 B1
(45) Date of Patent: May 11, 2004

(54) STAGGERED FRAME ELEMENT WITH OVERLAP

(75) Inventor: Anthony Scott Royer, Minburn, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/326,661

(22) Filed: Dec. 19, 2002

(51) Int. Cl.$^7$ .............................................. A01B 63/00
(52) U.S. Cl. ...................... 172/462; 172/452; 172/776
(58) Field of Search ................................ 172/776, 482, 172/669, 668, 452, 238, 392, 417, 395, 401, 677, 407, 396, 397, 679, 462; 111/52, 53, 70

(56) References Cited

U.S. PATENT DOCUMENTS

| | | | | |
|---|---|---|---|---|
| 3,568,777 | A | * | 3/1971 | Hook .......................... 172/316 |
| 3,783,951 | A | * | 1/1974 | Gugin .......................... 172/311 |
| 4,579,179 | A | * | 4/1986 | Vachon ........................ 172/395 |
| 4,790,389 | A | * | 12/1988 | Adee et al. .................. 172/776 |
| 5,190,207 | A | * | 3/1993 | Peck et al. ................... 228/170 |
| 5,632,567 | A | * | 5/1997 | Lowe et al. ..................... 403/3 |
| 6,016,877 | A | * | 1/2000 | Noonan et al. ............. 172/776 |
| 6,213,221 | B1 | * | 4/2001 | Lewallen .................... 172/776 |
| 6,382,327 | B1 | * | 5/2002 | Mosdal ........................ 172/311 |
| 6,401,832 | B1 | * | 6/2002 | Payne et al. ................. 172/238 |

OTHER PUBLICATIONS

Deere & Company, patent application entitled "Implement Lift and Level System with a Front Mounted Direct Coupled Rockshaft" filed on Dec. 19, 2002.
Deere & Company, Parts Manual for 637 Disk, p. 16, publication date—Apr. 8, 1999, published in U.S.A.
Deere & Company, Spacing Diagram, p. 30–9, publication date—Oct. 10, 2000, published in U.S.A.
Deere & Company, Manual for 2400, p. 45–8, publication date—Oct. 10, 2000, published in U.S.A.

* cited by examiner

*Primary Examiner*—Victor Batson

(57) ABSTRACT

A transverse rank particularly useful with implement split frame construction includes first and second transversely extending tubular members welded to the fore-and-aft tubes on first and second halves of the frame. The locations of the first and second tubular members on the respective fore-and-aft tubes are staggered. The members are sufficiently long so that they overlap and abut when the frame halves are assembled. The rear face of the forwardmost member abuts the forward face of the rearmost member, and the two tubular members are bolted together at the overlapping portions.

20 Claims, 2 Drawing Sheets

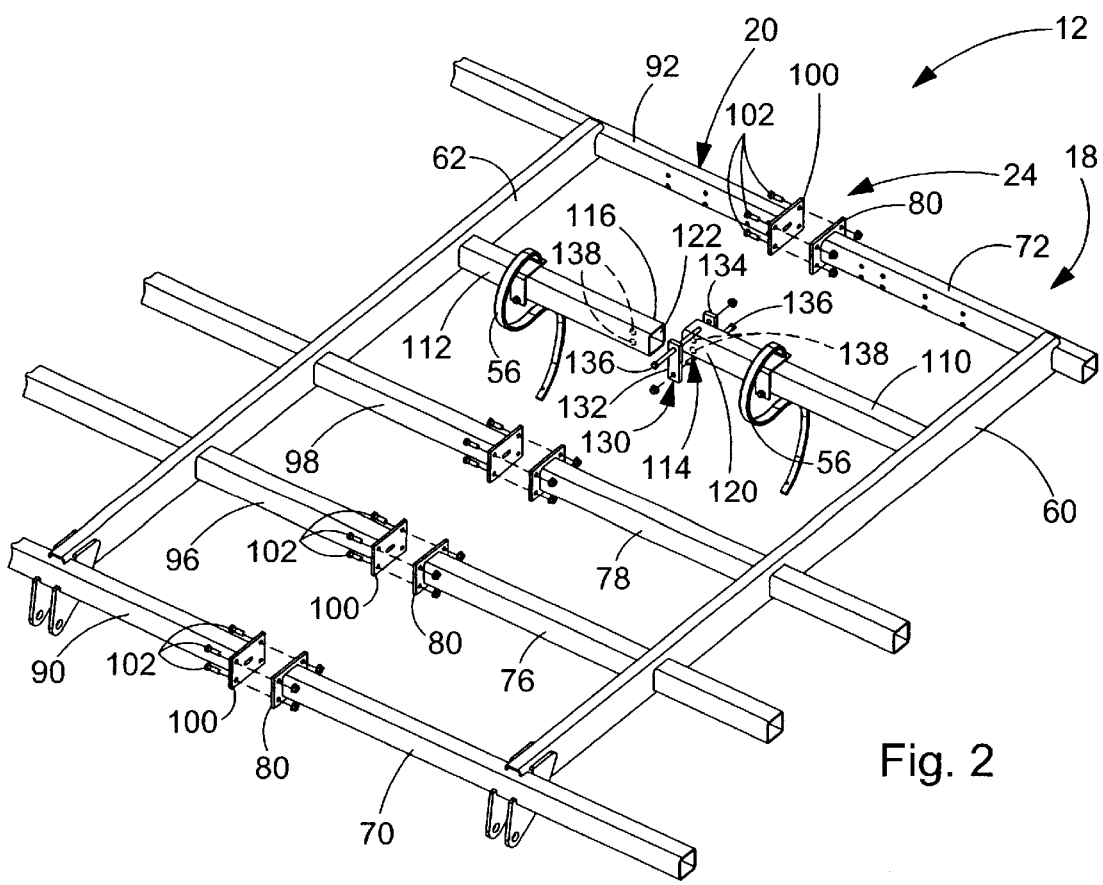

Fig. 2

```
┌─────────────────────────────┐
│ CONNECT TRANSVERSE TUBES    │
│ AND ADDITIONAL RANK TUBES   │◄── 160
│ TO FORE-AND-AFT MAIN FRAME  │
│ TUBES                       │
└──────────────┬──────────────┘
               ▼
┌─────────────────────────────┐
│ SHIP TO DEALER              │◄── 162
└──────────────┬──────────────┘
               ▼
┌─────────────────────────────┐
│ CONNECT TRANSVERSE TUBES    │
│ AT ENDS AND OVERLAP         │◄── 164
│ ADDITIONAL RANK TUBES       │
└──────────────┬──────────────┘
               ▼
┌─────────────────────────────┐
│ CLAMP ADDITIONAL RANK TUBES │◄── 166
│ TOGETHER IN AREA OF OVERLAP │
└─────────────────────────────┘
```

Fig. 3

STAGGERED FRAME ELEMENT WITH OVERLAP

FIELD OF THE INVENTION

The present invention relates generally to agricultural implements and, more specifically, to frames for such implements.

BACKGROUND OF THE INVENTION

Implement frames for tillage and seeding equipment often include main frames which are assembled from half-sections for shipping and connected during final machine assembly. The frames are split, and transverse ranks supported from fore-and-aft tubes include abutting connectors which are bolted together to form the main frame. If an additional rank is needed extending between the fore-and-aft tubes to support tools or other hardware, apertured end plates are typically welded to a tube, and the welded plates are then connected to the fore-and-aft tubes using U-bolts. Other attachment methods may also be used, but the presently available structures usually require manufacture, shipping and assembly of extra parts. These parts, which are usually attached by the dealer at a specified location on the frame, add cost and complexity to the frame and increase assembly time.

SUMMARY OF THE INVENTION

It is therefore an object of the invention to provide an improved split frame construction for an agricultural implement frame. It is another object to provide such a frame construction which overcomes the aforementioned problems.

It is another object of the present invention to provide an improved implement frame construction for adding an additional rank. It is a further object to provide such a construction which is particularly useful with split frames.

It is yet another object of the present invention to provide an improved split frame construction with an additional rank which has fewer parts, is less expensive and is easier to assemble than at least most previously available frame constructions.

A transverse rank particularly useful with implement split frame construction includes first and second transversely extending tubular members connected to the fore-and-aft tubes on first and second halves of the frame. The locations of the first and second tubular members on the respective fore-and-aft tubes are staggered, and the tubular members are long enough to overlap. When the frame halves are assembled, the rear face of the forwardmost member abuts the forward face of the rearmost member. The two tubular members are then bolted together at the overlapping portions.

The overlapping design is simple, inexpensive, and easy to assemble. The number of parts that have to be shipped to the dealer and dealer assembly time are reduced compared to at least most previously available structures for split frame construction.

These and other objects, features, and advantages of the present invention will become apparent upon reading the following description in view of the drawings.

BRIEF DESCRIPTION OF THE DRAWINGS

FIG. 2 is an enlarged perspective view of a portion of the frame of the implement of FIG. 1 illustrating the split construction of the frame.

FIG. 3 is a block diagram of steps of assembly of the frame.

DESCRIPTION OF THE PREFERRED EMBODIMENT

Figure 1:
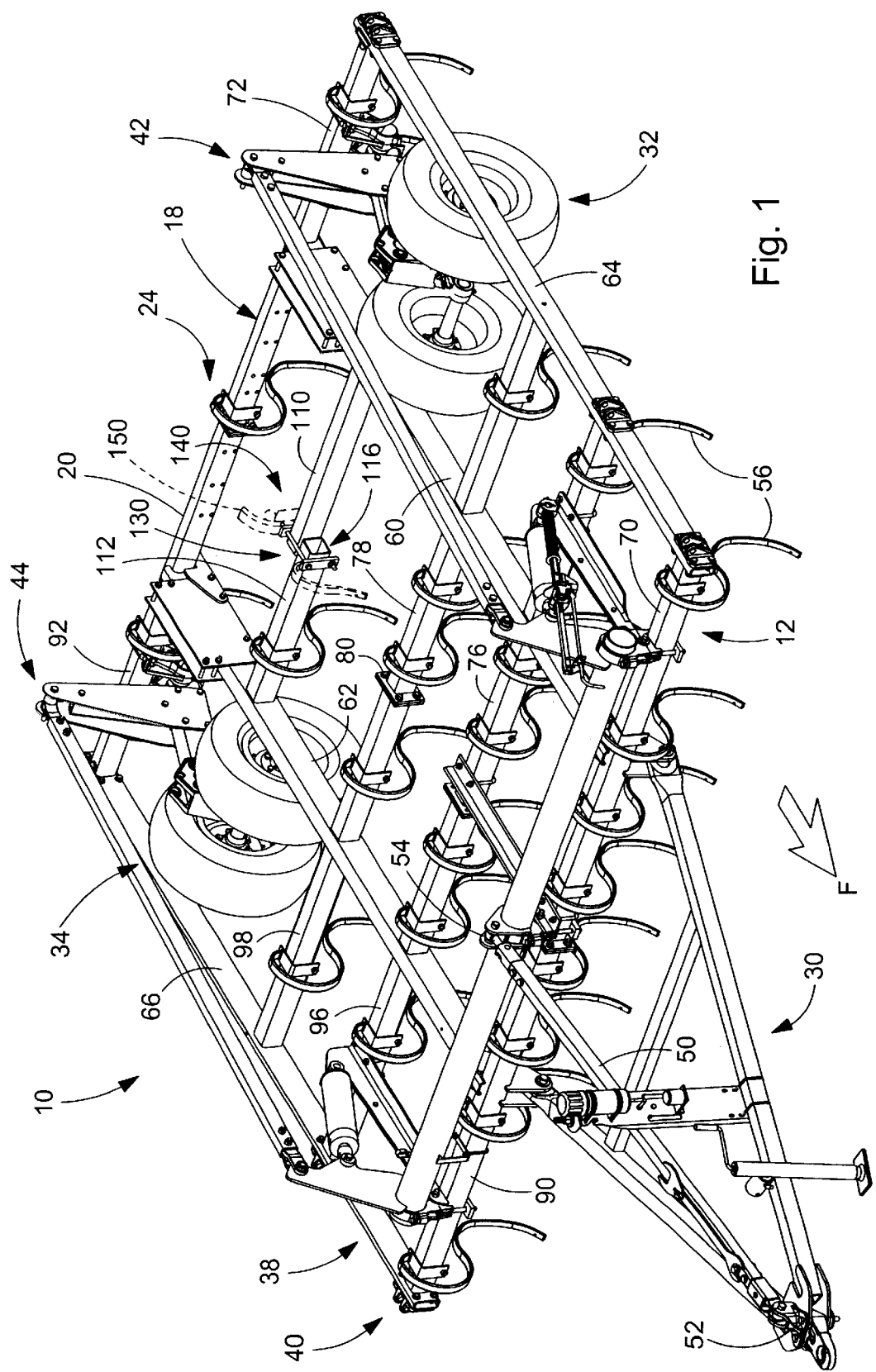
FIG. 1 is a perspective view of an implement with a frame having split construction.

Referring to FIG. 1, therein is shown a portion of an agricultural implement 10 having a main frame 12 of split construction with first and second sides or frame sections 18 and 20 generally joined at a central location 24. A leveling hitch assembly 30 is connected to the front of the main frame 12. Lift wheel modules 32 and 34 support the frame 12 for forward movement over the ground and are movable vertically to raise and lower the frame between field-working and transport positions. A hydraulically controlled rockshaft assembly 38 is connected to a forward rank (70, 90) of the frame 12. Lift linkages 42 and 44 operably connect the rockshaft assembly 38 to the wheel modules 32 and 34, respectively. The hitch assembly 30 includes a leveling link 50 pivotally connected to a forward connecting portion 52 and to a leveling arm 54 centrally located on the rockshaft assembly 38. The frame structure is generally as set forth in copending and commonly assigned U.S. patent application Ser. No. 10/1326,672 entitled "Implement Lift and Level System with a Front Mounted Direct Coupled Rockshaft", filed concurrently and of common ownership with the present application. Tools such as shown at 56 are connected to the frame.

The sections 18 and 20 of the frame 12 include first and second fore-and-aft extending inner tubes 60 and 62 and corresponding outer tubes 64 and 66. The left-hand frame section 18 (as viewed in the forward direction F) includes front and rear connecting or transverse frame tubes 70 and 72 extending from the outer tube 64 through the inner tube 60 to the central location 24. Transverse tubes 76 and 78 define rank portions behind the forward tube 70. Plate connectors 80 are fixed to the inner ends of the tubes 70, 72, 76 and 78. The structure of the section 20 is similar to that of the section 18, and includes front and rear transverse tubes 90 and 92 extending inwardly from the outer tube 66. Transverse tubes 96 and 98 align with the tubes 76 and 78, respectively, to define ranks behind a forward rank which includes the front tubes 70 and 90. Plate connectors 100 (FIG. 2) fixed to the inner ends of the tubes 90, 92, 96 and 98 are moved into alignment with the corresponding connectors 80 during final frame assembly at the implement dealer or purchaser location, and bolts 102 are inserted through mating apertures in the plates to secure the sections 18 and 20 together. When assembled, the tubes of the main frame 12 generally lie between planes lying closely adjacent and parallel to the upper and lower faces of the tubes 60, 62, 64 and 66.

To provide an additional rank between the front and rear ranks defined by the tube pairs 70, 90 and 72, 92, respectively, first and second staggered transverse tubes or members 110 and 112 are fixed relative to the inner walls of the fore-and-aft tubes 60 and 62 by a conventional method such as welding. The tubes 110 and 112 are longer than the other transverse tubes on the frame sections to define overlapping end portions 114 and 116. The first member 110 is offset in the fore-and-aft direction from the second member 112 and includes a forward facing wall 120 which abuts a rearward facing wall 122 of the tube 112 in the areas of overlap 114 and 116. The tubes 110 and 112 also generally lie between planes extending closely adjacent and parallel to the upper and lower faces of the tubes 60, 62, 64 and 66.

Connecting structure indicated generally at 130 secures the first and second members 110 and 112 together at the overlapping end portions 114 and 116. As shown, the connecting structure 130 includes brackets or apertured plates 132 and 134 connected by bolts to urge the walls 120 and 122 into firm contact with each other at the overlapping end portions 114 and 116. Other types of connecting structure such as U-bolts or bolts extending through apertures 138 (broken lines in FIG. 2) in the overlapping end portions could also be used. The members 110 and 112 define a continuous rank 140 extending transversely between the inner tubes 60 and 62 and located between the front and rear tubes 70, 90 and 72, 92 for supporting tools 56. If desired, a tool support 150 (broken lines of FIG. 1) can be incorporated into or form part of the connecting structure 130 so that a tool can be positioned directly at the overlapping area.

Steps for assembling the frame 12 as shown in FIG. 3 include at 160 forming the individual frame sections 18 and 20 by connecting the transverse tubes to the fore-and-aft extending tubes for each section. The individual frame sections 18 and 20, which are conveniently sized for easier handling and for meeting shipping dimension requirements, are then transported to a dealer or other purchaser (162). The dealer then assembles the main frame 12 at 164 by abutting and bolting the plates 80, 100 together. The overlapping portions 114 and 116 of the members 110 and 112 are then connected together (166).

Having described the preferred embodiment, it will become apparent that various modifications can be made without departing from the scope of the invention as defined in the accompanying claims.

What is claimed is:

1. An agricultural implement frame having a split construction including first and second sections with respective first and second fore-and-aft extending tubes and transverse frame tubes, the transverse frame tubes connectible to form a main frame, the frame including:
    a first transverse member of tubular cross section including a rearwardly facing planar wall, the first transverse member connected at a first location to the first fore-and-aft extending tube;
    second transverse tubular member of tubular cross section including a forwardly facing planar wall, the second transverse tubular member connected at a second location to the second fore-and-aft extending tube, the second location offset rearwardly from the first location;
    wherein the first and second transverse members define an area of overlap when the transverse frame tubes are connected to form the main frame, and the forwardly facing and rearwardly facing planar walls abut at the area of overlap; and
    connecting structure securing the first and second transverse members together at the area of overlap to thereby define a rigid supporting rank extending continuously between the first and second fore-and-aft extending tubes and offset from the transverse frame tubes.

2. The frame as set forth in claim 1 wherein the first and second transverse members are approximately level with each other and with the fore-and-aft extending tubes.

3. The frame as set forth in claim 1 wherein the connecting structure includes clamp means selectively positionable along the area of overlap.

4. The frame as set forth in claim 3 wherein the clamp means comprises bolt structure.

5. The frame as set forth in claim 3 wherein the clamp means includes structure for supporting an earthworking tool from the transverse members adjacent the area of overlap.

6. The frame as set forth in claim 1 wherein the connecting structure includes apertured portions in the area of overlap, and bolts extending through the apertured portions.

7. The frame as set forth in claim 1 wherein the first and second transverse members are welded to the first and second fore-and-aft extending tubes.

8. A method of fabricating an agricultural implement frame adapted for forward movement over the ground, the frame having a split construction including first and second sections with respective first and second tubes extending in a fore-and-aft direction, and first and second sets of transverse frame tubes connected to the respective first and second tubes, comprising:
    connecting the first and second sets of transverse frame tubes together to form a main frame;
    connecting a first transverse rank portion having a planar face directed in a first direction to the first tube at a first location along the first tube; and
    connecting a second transverse rank portion having a mating face directed in a direction opposite the first direction to the second tube at a location offset in the fore-and-aft direction from the first location to provide overlapping of end portions of the first and second transverse rank portions with the planar face adjacent the mating face;
    abutting the planar face against the mating face at the overlap of the end portions; and
    connecting the overlapped and abutted end portions together to form a rank extending continuously between the first and second tubes and offset from the first and second sets of transverse frame tubes.

9. The method as set forth in claim 8 wherein the step of connecting the first and second sets of transverse tubes comprises connecting forward and aft transverse tubes located on opposite sides of the first and second transverse rank portions so that the first and second transverse rank portions define an intermediate rank between the forward and aft tubes.

10. The method as set forth in claim 8 wherein the step of connecting the end portions together comprises clamping the end sections together with bolt structure.

11. The method as set forth in claim 8 wherein the steps of connecting the first and second transverse rank portions comprise welding the first transverse rank portion to an inside face of the first tube and welding the second transverse rank portion to an inside face of the second tube.

12. The method as set forth in claim 8 wherein the steps of connecting the first and second transverse rank portions occur prior to the step of connecting the first and second sets of transverse frame tubes together to form a main frame.

13. The method as set forth in claim 12 further including the step of shipping the first and second sections to an assembler of the sections after the steps of connecting a first and second transverse rank portions to the first and second tubes and prior to the step of connecting the first and second sets of transverse frame tubes together to form a main frame.

14. The method as set forth in claim 8 wherein the step of connecting the overlapped and abutted end portions includes providing clamping structure and additionally utilizing the clamping structure for attaching a tool to the abutting end portions.

15. The method as set forth in claim 8 wherein the steps of connecting the first and second transverse rank portions includes maintaining the rank portions generally between planes defined by upper and lower surfaces of the first and second tubes.

16. An agricultural implement frame including first and second sides with respective first and second fore-and-aft extending tubes and transverse frame tubes connecting the fore-and-aft extending tubes and defining tool supporting forward and aft ranks, the frame including:

- a first transverse rank portion of rectangular cross section with front and rear walls connected at a first location to the first fore-and-aft extending tube;
- second transverse rank portion of rectangular cross section with forward and aft walls connected at a second location to the second fore-and-aft extending tube, the second location offset rearwardly from the first location;
- wherein the first and second transverse rank portions overlap at an area of overlap and the forward wall of the second transverse rank portion abuts the rear wall of the first transverse rank portion; and
- connecting structure securing the first and second transverse rank portions together at the area of overlap to define a rigid intermediate supporting rank extending continuously between the first and second fore-and-aft extending tubes and offset from the forward and aft ranks.

17. The frame as set forth in claim 16 wherein the connecting structure comprises a tool support for supporting a tool at the area of overlap.

18. The frame as set forth in claim 16 wherein the transverse frame tubes are bifurcated to define a two section split frame construction for shipping and include connectors for joining the section after shipment, the first and second transverse rank portions overlapping and abutting when the sections are joined.

19. The frame as set forth in claim 16 wherein the transverse rank portions are generally level with the first and second fore-and-aft extending tubes.

20. The frame as set forth in claim 16 wherein the connecting structure comprises removable bolt structure and the first and second transverse rank portions are welded to inside surfaces of the fore-and-aft extending tubes.

\* \* \* \* \*